(12) United States Patent
Mashtare

(10) Patent No.: US 7,869,099 B2
(45) Date of Patent: Jan. 11, 2011

(54) METHOD AND APPARATUS FOR IMAGE QUALITY DIAGNOSIS

(75) Inventor: Dale R. Mashtare, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 1310 days.

(21) Appl. No.: 11/125,116

(22) Filed: May 10, 2005

(65) Prior Publication Data
US 2006/0256394 A1 Nov. 16, 2006

(51) Int. Cl.
H04N 1/00 (2006.01)
H04N 1/04 (2006.01)
(52) U.S. Cl. .................................. 358/406; 358/474
(58) Field of Classification Search ................ None
See application file for complete search history.

(56) References Cited

U.S. PATENT DOCUMENTS

| | | | |
|---|---|---|---|
| 4,294,534 A | 10/1981 | Snelling | |
| 4,345,835 A | 8/1982 | Kramer et al. | |
| 4,376,576 A | 3/1983 | Snelling | |
| 4,424,523 A | 1/1984 | Snelling et al. | |
| 4,524,395 A * | 6/1985 | Banton | 358/300 |
| 5,243,382 A * | 9/1993 | Takano et al. | 399/8 |
| 6,229,968 B1 | 5/2001 | Martin et al. | |
| 6,771,912 B1 * | 8/2004 | Mo et al. | 399/46 |
| 6,819,352 B2 | 11/2004 | Mizes et al. | |
| 2004/0135878 A1 | 7/2004 | Mizes et al. | |

FOREIGN PATENT DOCUMENTS

| | | |
|---|---|---|
| EP | 0 551 176 A2 | 7/1993 |
| JP | A-4-277767 | 10/1992 |
| JP | A-2002-82302 | 3/2002 |
| JP | A-2004-53944 | 2/2004 |

* cited by examiner

Primary Examiner—David K Moore
Assistant Examiner—Marcus T Riley
(74) Attorney, Agent, or Firm—Oliff and Berridge, PLC

(57) ABSTRACT

For an automatic image diagnosis, toned images or residual toner existing on the photoconductive surface of a photoreceptor may be scanned with light energy provided by the raster scanning system. The light energy, which may be reflected from the photoreceptor surface, may be disturbed due to scattering/absorption in toned or damaged surface regions. The light energy may be directed to image sensors to obtain a spatial image map of the photoreceptor surface in conjunction with pixel clock information present for the raster scanning system. The evaluation may be made based on the spatial image map. Diagnostic and maintenance may then be applied to correct the defect and/or adjust a tone level for a latent image formed on the photoreceptor surface.

20 Claims, 2 Drawing Sheets

METHOD AND APPARATUS FOR IMAGE QUALITY DIAGNOSIS

BACKGROUND

Electrophotographic printing processes generate toned images upon the surface of a photoreceptor drum or belt surface corresponding to the exposure pattern produced by a raster output scanning (ROS) system. The toned image is then subsequently transferred from the photoreceptor surface to either an intermediate transfer medium or the final imaging substrate, depending upon the specific printer embodiment. Residual toner may exist on the photoreceptor surface after this transfer process, which is typically removed via an electrophotographic cleaning subsystem. After this cleaning process, toner may still remain on the photoreceptor drum or belt according to the efficiency and condition of the cleaning station. In addition, defects may occur on the surface of the photoreceptor drum or belt due to scratches or wear by recording medium or the like. Such excess toner and defects may cause a loss in quality of images exposed on the photoreceptor surface. During these phases of the electrophotographic processes, inspection of the toner image existing on the photoreceptor drum, or residual toner layers occurring either after the transfer station or after the cleaning station, or inspection of the photoreceptor surface itself, may be applied to predict image quality performance of the process.

Detection of image quality issues on a printed page has been described in U.S. Pat. No. 6,819,352, in which sensor arrays are applied to capture 2-D images from the final print. A print is scanned to provide input for image uniformity adjustment Raster input scanning systems have been described for use in multifunction devices to scan a toned image on the photoreceptor surface to render a digital input file, and may be used to achieve high resolution capability and speed. For example, U.S. Pat. Nos. 4,294,534, 4,345,835 and 4,376,576 disclose such multifunction image processing systems having a collection rod that senses the presence or absence of light beam reflected by a photoconductive surface and provides an analog image signal representative of a developed image scanned.

SUMMARY

However, this approach may be limited in terms of image resolution and/or sampling due to physical constraints on the image capture sensor and/or temporal response. Additionally, illumination required for such devices often leads to issues with existing photoconductive surfaces, which may be tailored for sensitivity to the ROS output wavelength and power.

Moreover, such defects occurring to this extent often require intervention by an operator or service personnel to correct the problem. Simple machine sensors, such as toner area coverage sensors, provide feedback for print performance control loops, but provide only limited information relative to the printer performance.

Enabling more complete image quality performance monitoring, diagnosis, and correction capability with intermediate image sensors, is advantageous in automated controls and service architectures.

For an automatic image diagnosis, a photoreceptor surface of a photoreceptor may be illuminated with light from a light source of a raster scanning system. The light energy, which may be applied with corresponding pixel clock information in defining spatial information, may be illuminated onto the photoreceptor surface, and the light energy transmitted from the photoreceptor surface may be received by an image sensor and transformed into corresponding spatial image map of the photoreceptor surface.

The light energy may be transmitted through the bulk of the photoreceptor to an image sensor, in the case of a translucent photoreceptor configuration, or reflected from the surface of the photoreceptor. Disturbance of this transmitted light energy due to the presence of toner particles on the surface of the photoreceptor or surface defects, such as scratches, may result in a variation in the transmitted light energy. The spatial image map derived of this photoreceptor surface in the presence of toner and/or surface defects may be evaluated for determining whether an image defect is present.

These and other features and advantages are described in or are apparent from the following detailed description of various exemplary embodiments.

BRIEF DESCRIPTION OF THE DRAWINGS

Exemplary embodiments are described in detail, with reference to the following figures in which like reference numerals refer to like elements, and wherein.

DETAILED DESCRIPTION OF EMBODIMENTS

The following detailed description describes exemplary embodiments of apparatuses, methods and systems for detecting defects and/or excess toner on a photoreceptor element, such as drum or belt. For the sake of clarity and familiarity, specific examples of electrical and/or mechanical devices may be provided. However, it should be appreciated that the details and principles described herein may be equally applied to other electrical and/or mechanical devices as well.

A method of monitoring print image quality performance at intermediate steps in the print generation process may enable system adjustments or may determine necessary service actions to rectify a detected problem. For example, utilizing the raster output scanner of a electrophotographic print engine with a modified optical path and collection rods with a photodetector, image capture from a surface of a photoreceptor element may be accomplished in multiple regions for more completed diagnostic capability.

Figure 1:
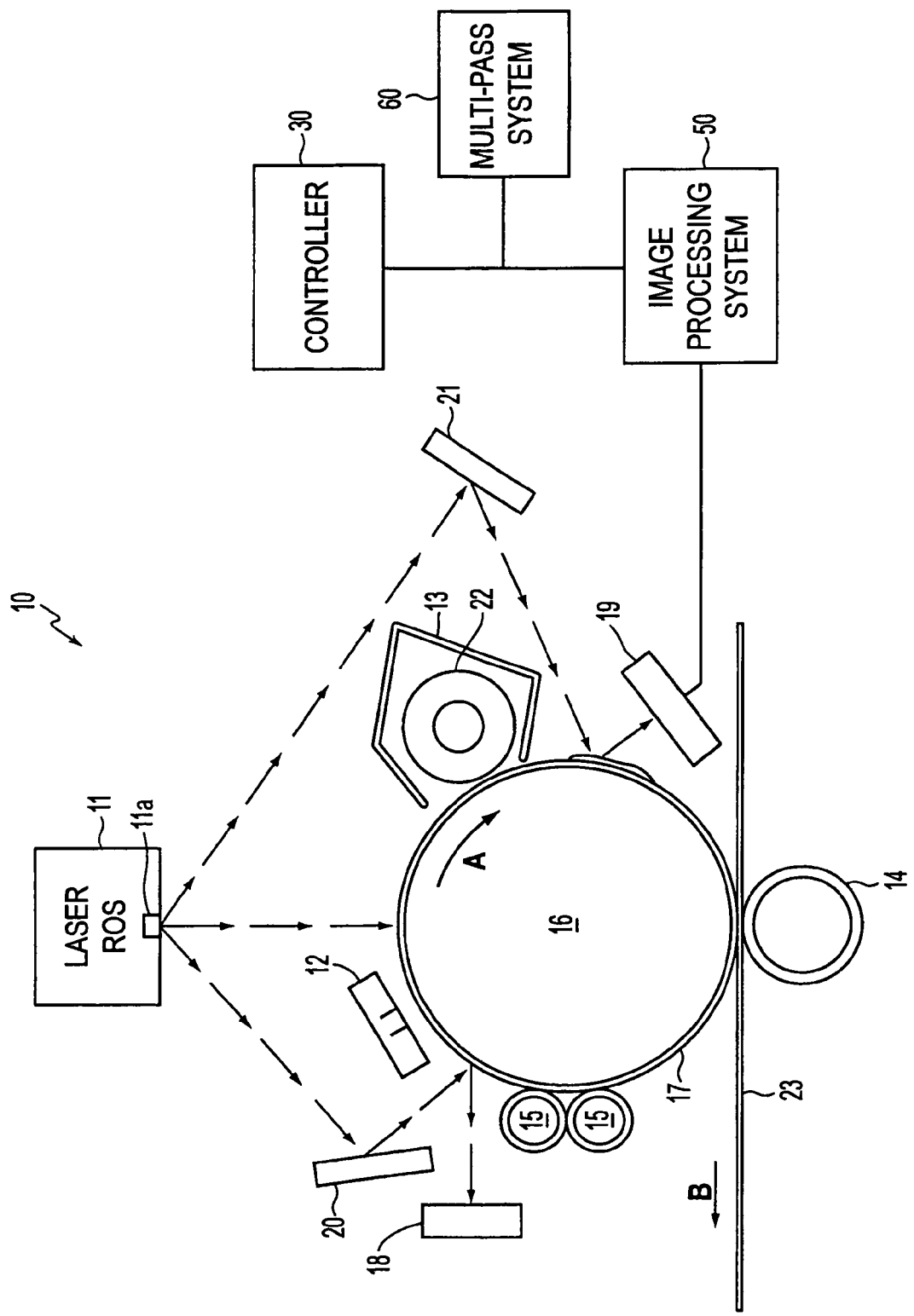
FIG. 1 is a schematic diagram of an image diagnosis system.

FIG. 1 is a schematic diagram of an image diagnosis system. An exemplary electrophotographic reproduction apparatus 10 may include a laser raster output scanning (ROS) system 11 including a light source 11a, a charging station 12, a developing station 13, a transfer station 14, a cleaning station 15 and a photoreceptor element, drum or belt (hereinafter, photoreceptor) 16 having a photoreceptor surface 17, which may rotate in a direction indicated by arrow A. The reproduction system 10 may also include a controller 30 that controls functions for various parts in the reproduction system 30, an image processing system 50 and a multipass system 60.

As the photoreceptor 16 rotates, the charging station 12 may charge the photoreceptor surface 17. The laser ROS system 11 may illuminate the charged portion of the photoconductive surface 17 with light, and thereby may cause the photoconductive surface 17 to record an electrostatic latent image thereon, for example, corresponding to an electronic input signal representing an electronic original or hardcopy original which may have been captured via an input scanning device. Two laser ROS systems 11 may be provided so that one laser ROS system may illuminate light for only the diagnosis purpose, while the other laser ROS system may separately illuminate light for creating the electrostatic latent image. Alternatively, a single ROS system may be applied to serve both functions.

After the electrostatic latent image is recorded on the photoreceptor surface 17, the photoreceptor 16 may advance the latent image to developing station 13, where toners, in the form of liquid or dry particles, may be electrostatically attracted to the latent image using commonly known techniques, such as by using a magnetic brush 22 or the like. The latent image may attract toners from carrier granules forming a toner image thereon.

As successive electrostatic latent images may be developed, toners may be depleted from the developer material.

After the electrostatic latent image is developed, the toner image on photoreceptor surface 17 may advance to the transfer station 14. A print sheet 23 from a sheet stack (not shown) may be advanced to the transfer station 14, for example, by a sheet feeding apparatus (not shown). The toner image formed thereon may contact the advancing sheet 23 at the transfer station 14. The transfer station 14 may include a corona generating device (not shown), which may spray ions onto the back side of the sheet 23. This may attract the toner image from photoconductive surface 17 to the sheet 23. After transfer, the sheet 23 may continue to move in the direction of arrow B via a belt transport (not shown), which may advance the sheet 23 to a fusing station (not shown).

The cleaning station 15 may include, for example, a rotatably mounted fibrous brush (not shown) in contact with the photoreceptor surface 17 to disturb and remove paper fibers and a cleaning blade (not shown) to remove nontransferred toners that remain on the photoreceptor surface 17. The blade may be configured in either a wiper or doctor position depending on the application.

The photoreceptor surface 17 may include a uniform layer of photoconductive material, as part of a photoreceptor belt or drum. The photoreceptor 16 may commonly be a multilayered device including a substrate with a conductive layer, an adhesive layer, a charge generating layer and a charge transport layer.

The reproduction apparatus 10 may also include a first image sensor 18 and a second image sensor 19, which may receive the light from the ROS system 11. The light may be received as optically redirected via mirrors 20 and 21, respectively. The mirrors may be replaced with appropriate lens configurations. In the case of a translucent photoreceptor device, the light may be directly illuminated through the bulk of the photoreceptor from the ROS system 11 to image sensors positioned internal (not shown) to the photoreceptor structure 16.

The first image sensor 18 may detect any excess toner that remains on the photoreceptor surface 17 after cleaning by the cleaning station 15. The second image sensor 19 may detect the toned electrostatic image and determine whether the image quality is within a desired tolerance.

Image sensing may be accomplished with any suitable device, such as a CCD array. The image sensing may also be accomplished with an optical collection rod with single or multiple photodetectors as the sensing elements. An example of the optical collection rod may include a waveguide such as glass rod or fluorescing liquid material that is capable of propagating light energy to a photomultiplier tube that serves to convert the light energy into electrical signals. These electrical signals, applied in conjunction with timing signals from the ROS pixel clock applied for an image exposure subsystem, may be transformed into a digital spatial image map. Another example of image sensing may be accomplished with a fiber optic bundle with single or multiple photodetectors as the sensing elements.

Figure 2:
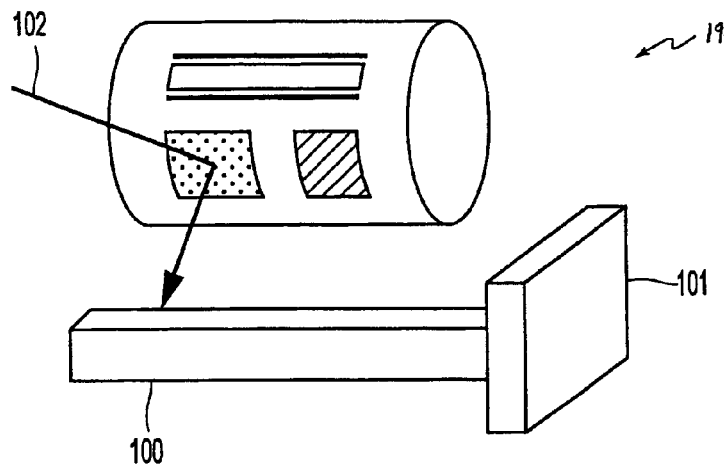
FIG. 2 is a schematic diagram of an intermediate image sensor.

FIG. 2 illustrates how the second image sensor 19 may detect the image quality, as an example. In this example, each of the first image sensor 18 and the second image sensor 19 includes an optical collection rod 100 and a photodetector 101. The optical collection rod 100 may be positioned in parallel with the longitudinal direction of the photoreceptor 16 and may collect the light energy 102 reflected by the photoreceptor surface 17. The photodetector 101 may be positioned at an end of the collection rod 100 and may detect the light that entered into the collection rod 100.

By illuminating the toned photoreceptor surface 17, the light energy reflected from the photoreceptor surface 17 onto the collection rod 100 with photodetector 101 may be modified due to scattering and/or absorption by the toner particles on the photoreceptor surface 17 (see FIG. 2), thereby providing a light signal corresponding to the toned image of the photoreceptor surface 17.

In other words, the light signal transmitted to the photodetector 101 of the intermediate image sensor 19 is attenuated according due to the presence of the toner on photoreceptor surface. The photodetector 101, which serves to convert the light energy into electrical signal corresponding to the attenuated light energy, provides a varied amplitude of electrical signal output according to toner present on the photoreceptor surface.

ROS pixel clock information, provided to temporally and spatially synchronize exposure elemental regions on the photoreceptor surface 17 to render a two dimensional image, may also be applied to synchronize image scanning of the photoreceptor surface information for image quality information capture.

The light signal captured by the first and second image sensors 18 and 19 and the synchronizing pixel clock information may be transformed into a representative digital image that then can be evaluated with the image processing system 50. The digital image may be an image map of the photoreceptor surface 17 indicating presence and amount of toner. The image processing system 50 may receive image signal information from the respective first and second image sensors 18 and 19 at various stages during electrophotographic process. The image processing system 50 may evaluate the information to determine whether there is an image defect. Such evaluation may be achieved by comparing the image maps of the photoreceptor surface 17 obtained at different stages of the electrophotographic process. Defects that may be encountered include nonuniformities of developed toner, in or across the process direction, excessive background toner, and developed toner line edge noise. If a defect is found, the image processing system 50 may report the defect to the controller 30 to take appropriate correction and/or adjustment, for example, through actuators available in the electrophotographic subsystems.

A multipass system 60 may be provided to allow the photoreceptor to cycle back to the intermediate image sensor arrangement, for example, as a diagnostic only mode. This may be applied to increase the accuracy of defining the spatial image map of the photoreceptor surface.

As depicted in FIG. 1, defects of the photoreceptor surface may occur at multiple sites throughout the electrophotographic process. Monitoring of the bare photoreceptor surface with the first image sensors 18 enables tracking of the photoreceptor surface 17 integrity over time to track defects, such as scratches or contaminants which may build up over time and may lead to print defects. By placing the image sensor downstream of the cleaning station 15, the cleaning system performance may also be addressed, for example, with the ability to measure particle counts on the photoreceptor surface 17.

Correction of the toned image surface post-development with the image sensor 19 may serve to provide image quality information pertaining to other subsystem components, such as the developing station 13. Although not depicted, one may readily envision application of an additional image sensor for post-transfer to probe the performance of the transfer station 14.

The optical collection rod may be implanted in the photoreceptor 16 with a transparent photoreceptor surface 17, by which the light may be directed to the ROS system 11 directly onto the optical collection rod.

Figure 3:
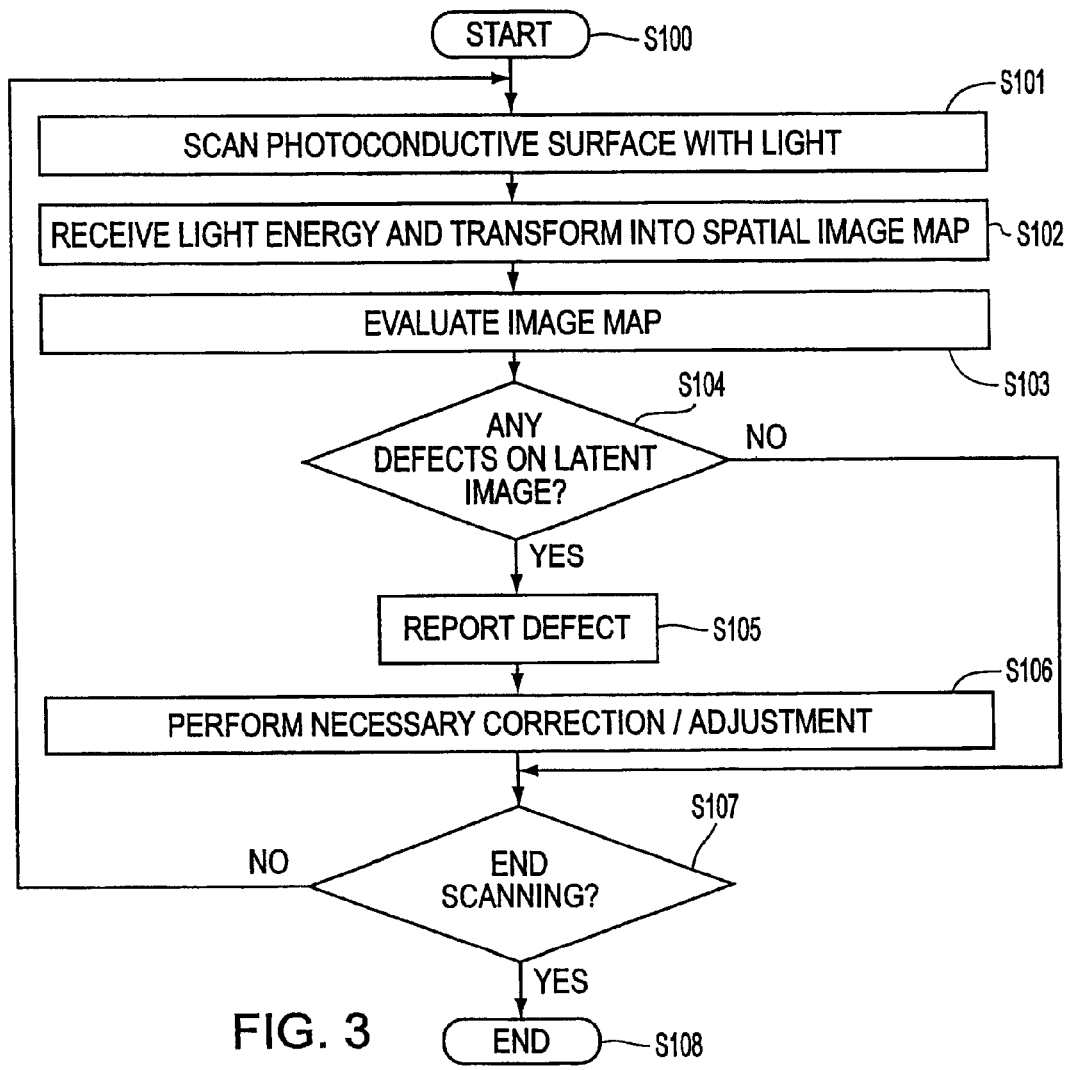
FIG. 3 is a flow chart explaining a method for image diagnosis.

FIG. 3 is a flow chart explaining an exemplary method for detecting image quality and performing image quality diagnostics.

The process begins at step S100 and continues to step S101. In step S101, the photoreceptor surface may be scanned with the light, such as laser beam, from the laser ROS system, and the process moves to step S102. In step S102, the light energy transmitted from the photoreceptor surface may be received by image sensors and transformed into a spatial image map, and the process continues to step S103. In step S103, an evaluation is performed based on the spatial image map.

In step S104, a determination may be made as to whether any defect, such as loss of image quality or excess toner, is detected in the scanned area of the photoconductive surface. To determine a defect, the scanned image may be compared with a predetermined image map with appropriate image processing techniques, for example, filtering and thresholding processes. If a defect, which may be sufficiently above the predetermined thresholds for amplitude and spatial dimensions, is detected, then the process moves to step S105, and otherwise, the process jumps to step S107.

In step S105, the defect may be analyzed and the analysis may be reported to the controller. Next, the process moves to step S106, where, based on the reported defects, the controller may take appropriate corrections and/or adjustments, such as allowing more toner to increase the toner density and/or darkness. The process may move optional to step S107 to determine whether the scanning should end. If not, then the process may return to step S101. Otherwise, the process may continue to step S108, where the method ends.

The above-described embodiment uses only one laser ROS system. The ROS system may be applied for multiple tasks, for example, including the normal exposure requirement and use for image quality diagnostics. However, it is apparent that more than one laser ROS system may be used such that one laser ROS system directly illuminates the photoconductive surface for recording electrostatic latent image on the photoconductive surface as an exposure system, while the another laser ROS system may scan the photoconductive surface for detecting the image quality or defects and excess toner on the photoconductive surface.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An image diagnostic system for an electrophotographic engine, comprising:
   a photoreceptor with a photoreceptor surface;
   a raster scanning system including at least one light source that illuminates the photoreceptor surface with light with corresponding pixel clock for monitoring spatial information such that light energy is transmitted from the photoreceptor surface;
   at least a first image sensor and at least a second image sensor that each receive the light energy transmitted from the photoreceptor surface and transform the light energy into corresponding spatial image maps of the photoreceptor surface;
   the at least the first image sensor is disposed to receive the light energy transmitted from the photoreceptor surface between a developing station and a cleaning station;
   the at least the second image sensor is disposed to receive the light energy transmitted from the photoreceptor surface between the cleaning station and a charging station; and
   an image processing system that evaluates the spatial image maps of the photoreceptor surface by comparing the spatial image maps to reference spatial image maps, and determines whether an image defect is present, wherein
   when the image processing system determines that an image defect is present, a corrective action is taken by the image diagnostic system to correct the defect by one of: (1) adjusting an electrophotographic subsystem, or (2) adjusting an amount of toner, and
   the photoreceptor is separate from the at least the first and second image sensor.

2. The system of claim 1, wherein the light from the raster scanning system is reflected from the front surface of the photoreceptor onto the surface of the at least the first and second image sensors.

3. The system of claim 1, wherein at least one of the at least first and second image sensors includes at least one of an optical collection rod and at least one photodetector, a fiber optic bundle with at least one photodetector, and at least one CCD array.

4. The system of claim 1, wherein at least one of the at least first and second image sensors is positioned internal to the photoreceptor and receives light energy transmitted through the photoreceptor surface.

5. The system of claim 1, wherein the raster scanning system illuminates the photoreceptor surface to create a latent image on the photoreceptor surface.

6. The system of claim 1, wherein at least one of the at least first and second image sensors comprises a plurality of image sensors, the plurality of image sensors providing spatial image maps at multiple stages during an electrophotographic process for comparison of the spatial image maps along the electrophotographic process, and
   the image processing system compares the spatial image maps and evaluates the comparison to identify a source of image quality defect for correction.

7. The system of claim 1, further comprising a controller that instructs the electrophotographic engine to correct the identified image quality defect based on the evaluation.

8. The system of claim 1, wherein the at least one light source comprises at least two light sources, and at least one of the at least the first and second image sensors comprise at least two image sensors, each image sensor receiving the light from respective one of the at least one light sources.

9. The system of claim 1, further comprising a multi-pass system that cycles the photoreceptor, the raster output scanning system, at least one intermediate image sensor, and the image processing system to perform functions repeatedly.

10. A device for printing an image comprising:
the image diagnostic system of claim 1; and
an electrophotographic engine comprising:
a charging station that charges the photoconductive surface to expose a latent image;
a developing station that applies toner onto the latent image on the photoconductive surface;
a transferring station that transfers the toned image onto a recording medium; and
a cleaning station that cleans the toner remaining on the photoconductive surface.

11. A method of image diagnosis, comprising:
illuminating a photoreceptor surface of a photoreceptor with light from at least one light source of a raster scanning system, the light being provided with a corresponding pixel clock for monitoring spatial information such that light energy is transmitted from the photoreceptor surface;
receiving the light energy from the photoreceptor surface by at least a first image sensor and at least a second image sensor, wherein
the at least the first image sensor is disposed to receive the light energy from the photoreceptor surface between a developing station and a cleaning station, and
the at least the second image sensor is disposed to receive the light energy from the photoreceptor surface between the cleaning station and a charging station;
transforming the light energy into corresponding spatial image maps of the photoreceptor surface;
evaluating the spatial image maps of the photoreceptor surface by comparing the spatial image maps to reference spatial image maps; and
determining if an image defect is present based on the evaluation, wherein
when it is determined that an image defect is present, an action is taken to correct the defect by one of: (1) adjusting an electrophotographic subsystem, or (2) adjusting an amount of toner, and
the photoreceptor is separate from the at least the first and second image sensors.

12. The method of claim 11, further comprising:
reflecting the light from the raster scanning system by the photoreceptor surface before being received by at least one of the at least the first and second image sensors.

13. The method of claim 11, wherein the light energy from the photoreceptor surface is received by at least one of an optical collection rod and at least one photodetector, a fiber optic bundle with at least one photodetector, and at least one CCD array.

14. The method of claim 11, wherein at least one of the at least the first and second image sensors is positioned internal to the photoreceptor, and the light energy is received as being transmitted through the photoreceptor device.

15. The method of claim 11, wherein the raster scanning system illuminates the photoreceptor surface to create a latent image on the photoreceptor surface.

16. The method of claim 15, wherein at least one of the at least the first and second image sensors comprise a plurality of image sensors, and further comprising:
providing the plurality of image sensors to provide spatial image maps at multiple stages during an electrophotographic process for comparison of the spatial image maps along the electrophotographic process;
comparing the spatial image maps; and
evaluating the comparison to identify a source of image quality defect for correction.

17. The method of claim 11, further comprising correcting the defect based on the evaluation.

18. The method of claim 11, wherein the at least one light source comprises at least two light sources and at least one of the at least the first and second image sensors comprise two image sensors, further comprising receiving the light from the at least two light sources by the respective one of the at least the first and second two image sensors.

19. An image diagnosis system, comprising:
means for illuminating a photoreceptor surface of a photoreceptor with light from at least one light source of a raster scanning system, the light being provided with a corresponding pixel clock for monitoring spatial information such that light energy is transmitted from the photoreceptor surface;
means for receiving the light energy from the photoreceptor surface by at least a first image sensor and at least a second image sensor;
the at least the first image sensor is disposed to receive the light energy from the photoreceptor surface between a developing means and a cleaning means;
the at least the second image sensor is disposed to receive the light energy from the photoreceptor surface between a cleaning means and a charging means;
means for transforming the light energy into corresponding spatial image maps of the photoreceptor surface;
means for evaluating the spatial image maps of the photoreceptor surface by comparing the spatial image maps to reference spatial image maps; and
means for determining an image defect based on the evaluation, wherein
when it is determined that an image defect is present, an action is taken to correct the defect by one of: (1) adjusting an electrophotographic subsystem, or (2) adjusting an amount of toner, and
the photoreceptor is separate from the at least the first and second image sensor.

20. The system of claim 1, wherein the image defect is at least one of nonuniformities of developed toner, in or across the process direction, excessive background toner and developed toner line edge noise.

* * * * *